US008531731B2

(12) United States Patent
Wu et al.

(10) Patent No.: US 8,531,731 B2
(45) Date of Patent: Sep. 10, 2013

(54) IMAGE QUALITY PERFORMANCE FOR A COLOR MARKING DEVICE

(75) Inventors: Wencheng Wu, Webster, NY (US); Edul N. Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 761 days.

(21) Appl. No.: 12/727,692

(22) Filed: Mar. 19, 2010

(65) Prior Publication Data

US 2011/0228341 A1 Sep. 22, 2011

(51) Int. Cl.
G06T 5/00 (2006.01)

(52) U.S. Cl.
USPC ............ 358/3.26; 358/1.9; 382/112; 382/165

(58) Field of Classification Search
None
See application file for complete search history.

(56) References Cited

U.S. PATENT DOCUMENTS

| | | | |
|---|---|---|---|
| 7,239,422 B2 | 7/2007 | Braun et al. | |
| 7,245,395 B2 | 7/2007 | Couwenhoven et al. | |
| 7,365,879 B2 | 4/2008 | Braun et al. | |
| 7,376,269 B2 | 5/2008 | Klassen et al. | |
| 7,382,507 B2 | 6/2008 | Wu | |
| 7,486,416 B2 | 2/2009 | Dalal et al. | |
| 7,495,804 B2 | 2/2009 | Rozzi | |
| 2005/0160092 A1 | 7/2005 | Mestha et al. | |
| 2006/0103899 A1 | 5/2006 | Wu | |
| 2006/0110009 A1 | 5/2006 | Klassen et al. | |
| 2006/0215240 A1 | 9/2006 | Mongeon | |
| 2006/0244980 A1 | 11/2006 | Grace | |
| 2008/0137914 A1 | 6/2008 | Minhas | |

OTHER PUBLICATIONS

Briggs, et al., Applications of ISO-13660, A New International Standard for Objective Print Quality Evaluation, Imaging Society of Japan, Jul. 21-23, 1999 Tokyo, Japan.
Hann, Daniel S., "Specular Image Capture and Evaluation for Microgloss Uniformity Measurements," May 22, 2003.
"Image Technology Colour Management—Architecture, Profile Format, and Data Structure," Specification ICC.1:2004-10 (Profile Version 4.2.0.0); Revision of ICC.1:2003-09, With Errata Incorporated May 22, 2006m International Color Consortium, ICC 2004.
Rasmussen, et al., "ISO 19751 Macro-Uniformity", (Jan. 15, 2006).
U.S. Appl. No. 12/352,841, "Job-Specific Print Defect Management," filed Jan. 19, 2009.
U.S. Appl. No. 12/727,724, On-Paper Image Quality Metric Using On-Belt Sensing, filed Mar. 19, 2010.
U.S. Appl. No. 12/727,760, Color Mapping Determination for an N-Color Marking Device Based Upon Color Stability, filed Mar. 19, 2010.
U.S. Appl. No. 12/727,791, "Color Mapping Determination for an N-Color Marking Device Based Upon Image Spatial Noise Defects," filed Mar. 19, 2010.

*Primary Examiner* — Twyler Haskins
*Assistant Examiner* — Christopher D Wait
(74) *Attorney, Agent, or Firm* — Philip E. Blair; Fleit Gibbons Gutman Bongini & Bianco P.L.

(57) ABSTRACT

What is disclosed is a novel system and method for determining printer performance in terms of image quality defects over a large complex set of conditions based on measurements taken over a small simple set of conditions, thus reducing the amount of time, effort, and wasted paper required to obtain the data. The present system and method effectively utilizes a predictive model that predicts noise measurements of multi-separations from those of single-separation colors and/or a subset of the multi-separations. Because a model is used to comprehend color performance over the entire gamut, the number of patches is reduced. This reduction enables the method to be used within a machine to dynamically characterize the device's image quality performance. Various embodiments have been disclosed.

17 Claims, 14 Drawing Sheets

IMAGE QUALITY PERFORMANCE FOR A COLOR MARKING DEVICE

CROSS REFERENCE TO RELATED APPLICATIONS

This application is related to concurrently filed and co-pending U.S. patent application Ser. No. 12/727,724, entitled, "On-Paper Image Quality Metrics Using On-Belt Sensing".

TECHNICAL FIELD

The present invention is directed to systems and methods for determining image quality performance of a color marking system.

BACKGROUND

With the advent of in-line sensing technologies, it has become more and more common that color marking systems are able to gather information about image quality (IQ) defects and utilize that information, for example, to improve their image quality performance. The success of these technologies relies heavily on the timely availability of the information of image quality defects. A full characterization of the entire color space for a given image quality metric, such as mottle, graininess, banding, and temporal color variations requires a large number of printed patches. For many applications, it can be prohibitive to print and measure all colors of interest to build a comprehensive image quality performance database over a target device's entire color gamut.

Accordingly, what is needed in this art are increasingly sophisticated systems and methods for determining image quality performance for any color of interest based upon measurements obtained for a small number of single-separation colors.

BRIEF SUMMARY

What is disclosed is a novel system and method for determining printer performance in terms of image quality (IQ) over a large complex set of conditions based upon measurements taken over a small simple set of conditions. The present system and method utilizes a combination of print noise measurements of printed separation colors, the nominal printer model, for example, readily available from the color profiles, and statistical modeling techniques such as Monte Carlo simulation or a variance model, to predict noise of multi-separation colors from the single-separation colors. Because a model is used to comprehend image quality over the entire gamut, the number of patches is reduced. In such a manner, a given device's IQ performance can be dynamically characterized within the customers print/copy job environment. Advantageously, the present method is applicable to a wide variety of image quality defects caused by printer noises such as, for example, 2-D random (non-structured) spatial noise defects, such as mottle and graininess, 1D spatial defects, such as streaks, banding and moiré.

In one example embodiment, the present system and method for determining image quality variation of a color marking device involves performing the following. First, a device-independent color variation corresponding to an image quality variation for device-dependent single-separation colors of a target color marking device is received. A device-dependent color variation is estimated as a function of area-coverage for each colorant using said device-independent color variation which has been selected. Also a device-independent color variation for a device-dependent multi-separation color of interest is estimated. This estimation is based upon the device-dependent color variation as a function of area-coverage. The image quality variation of the target marking device is determined by using the estimated device-independent color variation for the device-dependent multi-separation color of interest. The measured image quality variation may be further defined as an image quality metric. The image quality metric can be any of: graininess, mottle, banding, temporal color variation, and streaking. Each of the measured image quality metrics is converted, in a manner more fully described herein, to a corresponding measure of device-independent color variation. In various embodiments hereof, the device-independent color variation for a device-dependent multi-separation color of interest is estimated using a Monte Carlo simulation. In other embodiments, the device-independent color variation for a device-dependent multi-separation color of interest is estimated using a variance model. Inputs to the variance model include the estimated device-dependent color variation as a function of area-coverage corresponding to each colorant, and/or a Jacobian matrix of a printer model of a target marking device. The predicted image quality variation of the target marking device can be used, for example, for performing a diagnostic, tracking, performing a maintenance, performing a color management parameter adjustment, device assessment, soft-proofing, workflow analysis, and notifying an operator.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
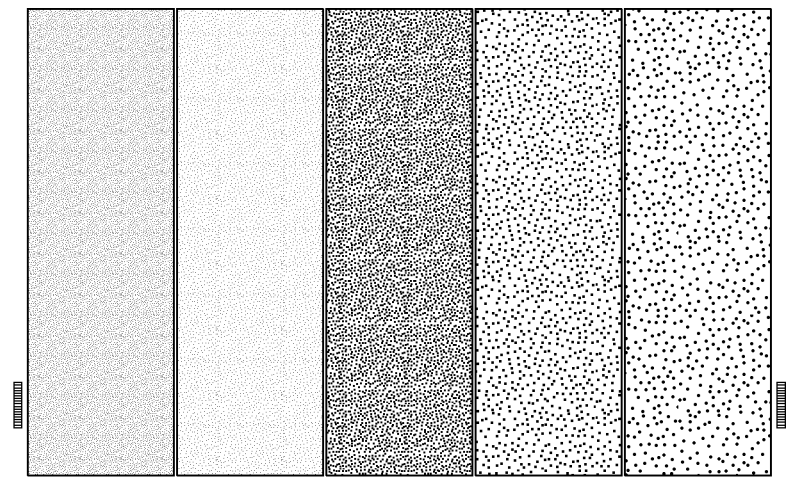
FIG. 1 is an example test-pattern for validating the predictive model used to correlate on-belt to on-paper measurements for single-separation colors.

What is disclosed is a novel system and method for determining printer performance in terms of image quality (IQ) over a large complex set of conditions based upon measurements taken over a small simple set of conditions. A first system and method used to predict the corresponding IQ metric on-paper for a selected IQ metric measured on-belt from an in-line sensor. A second novel system and method is used to determine a selected IQ metric on-paper for a selected CMYK colorant of interest from a small sample of IQ metric measurements on-paper.

It should be understood that one of ordinary skill in this art would be readily familiar with many facets of color science such as, but not limited to, color space, color gamuts, gamut mapping, device calibration, and other related techniques and algorithms commonly found in the digital document reproduction arts. Additionally, one of ordinary skill would also be familiar with techniques used for color manipulation and various color transformation processes and the systems involved with color imaging. Those of ordinary skill would be familiar with the text: "*Digital Color Imaging Handbook*", CRC Press (2003), ISBN-13: 9780849309007, and "*Control of Color Imaging Systems: Analysis and Design*", CRC Press (2009), ISBN-13: 9780849337468, both of which are incorporated herein in their entirety by reference. One of ordinary skill would also be knowledgeable about computer science and software and programming systems and methods sufficient to implement the functionality and capabilities described in detail herein in their own hardware environments without undue experimentation.

Non-Limiting Definitions

A "device-independent color space" is any standard color space that is commonly used to define or describe color, e.g. CIE XYZ, CIE L*a*b*, CIE L*u*v*, sRGB etc.

A "device-dependent color space" is a color space that is non-standard and cannot be used to commonly define colors without additional information such as the characteristics of the rendering device. For example, the commonly used CMYK color space for 4-color printers is a device-dependent color space since the rendering of a given CMYK color could yield very different (device-independent) colors from one model of a printer to another model of a printer. As another example, the non-standard RGB space is also a device-dependent color space since the rendering of an RGB image could appear differently from one model of a CRT monitor to another model of a CRT monitor.

A "color separation" refers to an individual separation corresponding to one of the colorants of a target marking system. For example, there are 4 separations: C, M, Y, K for a 4-color CMYK printer. Combinations of all color separations can be used to produce a range of colors by the target marking system.

A "single color separation" or "single-separation color" refers to a color specified with only one of the color separations for a target marking system. For example, for a CMYK printer, a C-only test patch is a single-separation color test patch.

A "multi-separation color" refers to a color specified with more than one of the color separations for a target marking system. For example, for a CMYK printer, a red test color is a multi-separation color test patch, using combinations of M and Y separations at some pre-determined levels.

A "colorant" refers to the medium used for rendering a particular color separation which, in forming a multi-colored image, is combined with one or more other colorants to achieve image colors throughout the spectrum. Each color separation thus may have its own corresponding colorant.

A "forward printer model" converts values in a device-dependent color space to values in a device-independent color space for a target marking system. An "inverse printer model" converts values in a device-independent color space to values in a device-dependent color space for a target marking system. A printer model can have the form of a look-up table (LUT) such as a 4-D LUT for a CMYK printer, or a parameterized fitted function such as a polynomial that relates inputs in device-dependent color space to outputs in device-independent color space. For CMYK color space as the target device-dependent color space and L*a*b* color space as the output device-independent color space, updating the forward printer model includes, for example, for each of a selected number of the nodes: (a) printing a patch using the specified CMYK components; (b) measuring the color L*a*b* of this printed patch; (c) compiling the relationship between this input CMYK specified and its corresponding measured output L*a*b* for each node; and finally (4) storing these compiled relationships of all the nodes in the form of a LUT. This LUT can now be used to map any CMYK in device-dependent color space to its predicated output L*a*b* in the device-independent color space for a target marking system, and is thus the printer model for this target marking system.

An "engine response curve" (ERC) gives the relationship between the measured lightness L* or color (L*,a*,b*) developed on the paper or on an internal media, and the input contone gray level. The ERC is estimated by printing a series of strips at different input gray levels and measuring their corresponding lightness L* or deltaE to paper to form a curve of lightness or deltaE to paper as a function of gray level. This curve is inverted to determine the corresponding colorant change needed in the gray level for an observed lightness variation at each input gray level. An example engine response curve is shown and discussed with respect to FIG. 8.

The "process direction" is the direction of movement of a media surface as the media traverses the marking mechanism.

The "cross-process direction" is the direction which is orthogonal to the process direction, i.e., perpendicular to the movement of the media traversing the marking mechanism.

"On-belt" refers to an imaging area within a color marking system, such as a belt, drum, or blanket with corresponding photoreceptors and intermediates of a color marking device, prior to the final fusing of the image to paper.

"Color variance" is the variance of raw color data measured from an image. Typically this raw data is further processed by a mathematical definition for determining a given image quality metric.

An "image quality metric" or "IQ metric" is a mathematical definition for determining a given image quality defect, such as, for instance, graininess (micro-uniformity), mottle (macro-uniformity), banding, streaking, and temporal color variation. The term image quality metric can also be used to describe the underlying variation of raw color data, from which the higher-level metrics listed above are calculated. One example of image quality metrics is described in *International Print Quality Standard*—ISO/IEC 13660:2001. This standard specifies device-independent image quality metrics, measurement methods, and analytical procedures to describe the quality of output images from hardcopy devices and is applicable to human-readable documents composed of binary monochrome images produced from impact printers, non-impact printers, and copiers.

"Graininess", as defined by ISO-13660, is the aperiodic fluctuation of density at a spatial frequency greater than 0.4 cycles per millimeter in all directions. Other definitions, such as with different spatial frequency ranges and/or measuring fluctuation at different color space (e.g. L* rather than density), exist as well. Methods to quantify graininess are well established. One method is to print and measure a test target consisting of a gray tone scale from 0% tint (white) to 100% (black) in 10% steps. Color tone sweeps like cyan, magenta, yellow, red, green, and blue may also be included in the target. Depending on the sample being measured, it might be desirable to perform more than one graininess measurement per patch to reduce errors introduced by sample variability. For samples with lower perceived graininess, consider making multiple measurements and calculating the average reflectance and average graininess values. In one embodiment, graininess is calculated as follows:

$$G = e^{-1.8D} \times \sum_{f_n} V(f_n) \times \sqrt{P'(f_n)},$$

where D is the density, $V(f_n)$ is visual transfer function as function of the mean density level and deviation from the mean, and $P'(f_n)$ is the power spectrum (compensating for aperture)

"Banding" consists of either horizontal or vertical bands, with a period that gradually varies from a minimum to a maximum value. Banding can thus be defined as a 1D image density variation in the process direction. It is often periodic and it can result from errors in the mechanical motion of rotating components, such as gears, pinions, and rollers in the charging and development subsystems, photoreceptors and their drive trains, or the ROS polygon, within a marking engine. Methods for measuring the banding induced density variation use an imaging system such as an offline scanner or in-situ sensors known as Enhanced Toner Area Coverage Sensors ("ETACS"). ETACS are used to measure the density of toner or colorant applied to or developed on a photoconductive member. Methods for measuring banding require an accurate profile of the density variation. Since the density variation is periodic, it can be characterized in terms of frequency (using Fourier analysis).

"Mottle" is the irregular arrangement of patches of color on an output print due to defective toner transfer from the belt to the image forming surface. Mottle is similar to graininess, but on a larger spatial scale (>250 μm). Various metrics have been developed by vendors, some proprietary, which are used to determine lightness variation of mottle. ISO-13660:2001 defines mottle as the Standard Deviation (STD) of Optical Density (OD) (rather than L*) between 1.27×1.27 mm² and 12.7×12.7 mm² scale over a defined spatial frequency. Xerox, in one embodiment, defines mottle as the standard deviation of L* (plus an OD correction) between 1.1×1.1 mm² and 5.5×5.5 mm² scale.

"Streaking" is pseudo-random one-dimensional defects in an image that run parallel to the process direction. Typical defects might arise from a non-uniform LED imager, contamination of the high voltage elements in a charger, scratches in the photoreceptor surface, etc. Graininess and mottle are usually not directionally oriented whereas streaks usually are.

"Temporal color variation" occurs when a first color printed at time T1 visually differs from the same color printed at time T2. Color variation is generally assessed by a color difference formula, ΔE (e.g. CIE DeltaE 2000). The ΔE's between individual measurements and their averages is an indication of the spatial or temporal non-uniformity of the output device depending on how the individual measurements were made.

Example Block Diagram for Prediction Model Construction

Reference is being made to FIG. 1 which is an example test-pattern for validating the predictive model used to correlate on-belt to on-paper measurements for single-separation colors. This test pattern is of a single color separation and is formed using techniques well known in the art from a color marking device, such as in FIG. 14. Although FIG. 1 is shown in black and white, those skilled in the art will recognize this as a color test patch of a single separation color. In this example the single separation color is cyan and this is discussed further in the section entitled "Determining A CMYK Of Interest From A Small Sample Of IQ Measurements".

Figure 2:
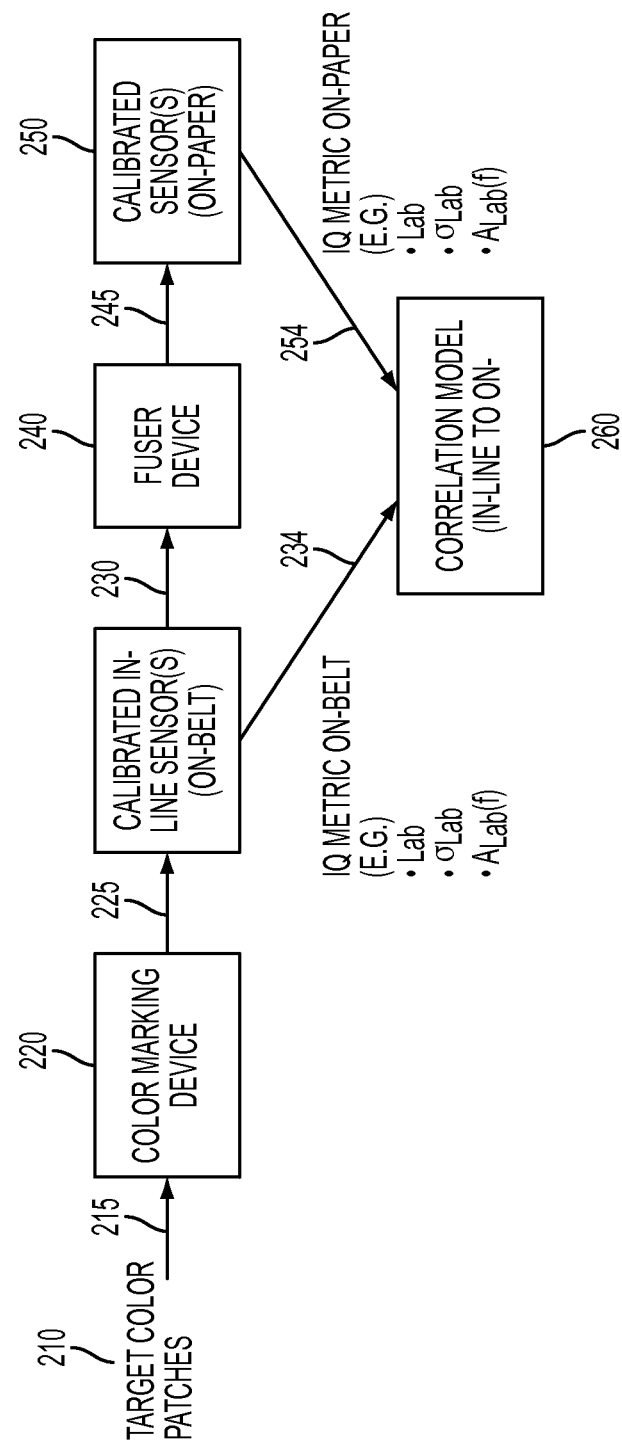
FIG. 2 is a block diagram illustrating one example embodiment of building a prediction model for correlating on-belt measurements to on-paper measurements using the example test patter of FIG. 1 as input.

Reference is now being made to FIG. 2 which illustrates a block diagram of one example embodiment of building a prediction model for correlating on-belt measurements to on-paper measurements using the example test pattern of FIG. 1 as input.

Data source 210, used to produce the example test pattern of FIG. 1, is an input. In this embodiment, target color patches are either single-separation colors or multiple-separation colors. Target data source 210 includes color marking device 220, calibrated on-belt sensor 230, fuser 240, and calibrated on-paper sensor 250. These devices are coupled together via data communication links 215, 225, 230, 245. These links may be any type of link that permits the transmission of data, such as direct serial connections, a local area network (LAN), wide area network (WAN), an intranet, the Internet, circuit wirings, and the like. The content for a print/copy job is initially provided by the customer through a target data source in a form acceptable to the print system. Target data source 210 may be a personal computer, a microprocessor, a scanner, a disk drive, a tape drive, a hard disk, zip drive, CD-ROM drive, a DVD drive, a network server, a print server, a copying device, or any other known or later developed device or system that is able to provide the image data. The target data source may include a plurality of components including displays, user interfaces, memory, disk drives, and the like. For simplicity, it will be assumed that target data source 210 comprises a personal computer although, as indicated above, the target data source is not limited to a personal computer.

Color marking device 220 may be any device capable of outputting a hard copy of an image and may take the form of a laser printer, a bubble jet printer, an ink jet printer, a copying machine, or any other known or later developed device or system that is able to generate an image on a recording medium using the image data or data generated from the image data. The color marking device generates the hard copy of the image based on printable image data generated by the color adjustment subsystem. Calibrated in-line sensor 230 may be any type of device that is capable of detecting image data from an unfused image and supplying the image data. The on-belt sensor is any color sensor such as a full-width array scan bar, an optical sensor, a spectrophotometer, a LED color sensor and other color sensor capable of measuring spatial and temporal image color values. Calibrated on-paper sensor 250 may be any type of device that is capable of detecting image data from a hard copy image and supplying the image data. For example, the calibrated on-paper sensor may be any color sensor such an optical sensor, a spectrophotometer, a LED color sensor and other color sensor capable of measuring spatial and temporal image color values. Both the calibrated in-line sensor 230 and the calibrated on-paper sensor 250 may be any other known or later developed device or system that is able to measure the color values of the image data from the hard copy image output by the color marking device. Correlation model 260 is built or updated using a cross-correlation computer-implemented algorithm on the measured data for a given IQ metric from the calibrated in-line sensor 230 and the calibrated on-paper sensor 250. Correlation model 260 is communicatively connected to receive data from the calibrated in-line sensor 230 and the calibrated on-paper sensor 250 though communication links 234 and 254. The image quality metrics received into the correlation model include $L^*a^*b^*$, $\sigma_{L^*a^*b^*}$, and $A_{L^*a^*b^*}(f)$, where $A_{L^*a^*b^*}(f)$ represents amplitude as a function of frequency.

Although for the purposes of the description hereof, the components in FIG. 2 are shown as being separate, they may be integrated into a digital copier, a computer with a built-in printer, or any other integrated device that is capable of producing a hard copy image output. With such a configuration, for example, the target data source 210, color marking device 230, calibrated in-line sensor 230, fuser 240, calibrated on-paper sensor 250, and correlations model 260 may be contained within a single device. Alternatively, other configurations of FIG. 2 may be utilized without departing from the spirit and scope of the specification and claims herein.

Example Flow Diagram of Prediction Model Construction

Figure 3:
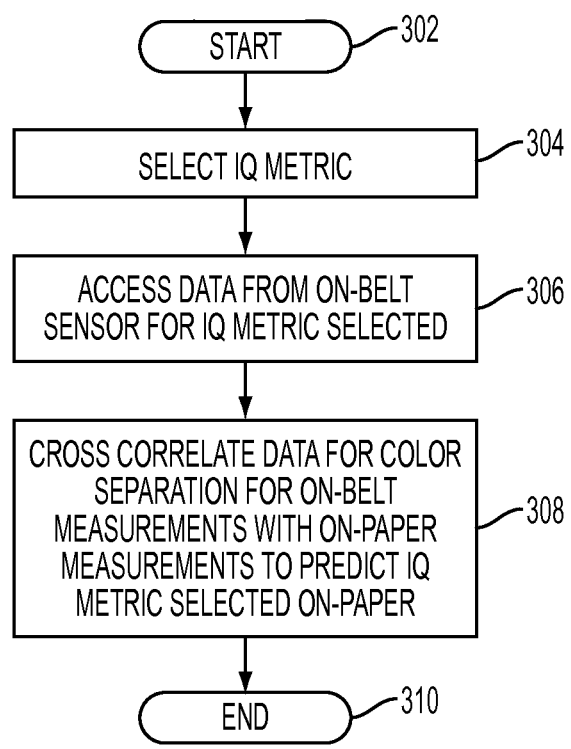
FIG. 3 is a flow diagram illustrating one example embodiment for selecting an image quality metric measured via on-belt sensing and predicting a corresponding image quality metric on-paper.

Reference is now being made to FIG. 3 which is a flow diagram illustrating one example embodiment for selecting an image quality metric measured via on-belt sensing and predicting a corresponding image quality metric on-paper. Flow processing begins at 302 and immediately proceeds to step 304.

At step 304, select an image quality metric, such as, graininess, banding, mottle, streaking, or temporal color variation. In one embodiment, the selection is performed in response to user input 1468 or by receiving a selection over a network.

At step 306, access measurement data from the calibrated on-belt sensor 220 corresponding to the selected image quality metric, e.g. $L^*a^*b^*$, $\sigma_{L^*a^*b^*}$, and $A_{L^*a^*b^*}(f)$. This measurement data includes image noise on an imaging member of the selected image quality metric in a single-separation device-dependent color for the target color marking device.

At step 308, use a predictive correlation model to predict the corresponding IQ metric on-paper. This prediction uses the correlation model, the image noise of single-separation device-dependent colors when printed on a substrate. The flow diagram ends in step 310.

This novel method is used to determine image quality performance of a color marking device. In the embodiment next described, an estimation of image noise performance values of multi-separation device-dependent colors on a substrate from the projected single-separation device-dependent colors on a substrate is performed using a noise prediction model. In another embodiment, the single-separation IQ measurements can be made on-paper rather than on-belt, thereby eliminating the step of correlating between on-belt and on-paper measurements. These on-paper measurements can be made inline or offline. These estimated noise performance values on a substrate are used then to determine image quality performance of the target marking device. The single-separation device-dependent colors in one embodiment are cyan, magenta, yellow, and black (CMYK).

In one embodiment the image noise performance values are compared against any of: a manufacturer's specification, and a user-defined specification, such as a print job. Based on this comparison, a determination of the image noise level of the target marking device relative to a defined noise tolerance level. The determination can include performing a diagnostic on the target marking device, performing maintenance on the target marking device, and notifying an operator of the target marking device. Once the current state of the target color marketing device, is determined based on the estimate image noise performance values, it can be used as a basis for performing any of: a color management parameter adjustment, device assessment, soft-proofing, and workflow analysis.

In another embodiment, the image noise performance values are collected over time intervals. These collected values are used to project when the target marking device will reach a defined noise tolerance threshold, the projection being based upon any of a time, a date, a count of a number of pages printed by the target marking device, and a number of hours of operation of the target marking device.

Still, in another embodiment, the estimated image noise performance values are used to determine image quality performance of the target marking device. An application dependent function having at least one user-selected image noise attribute as an input is determined. The user-selected image noise attribute and the estimated image noise performance values are provided to the function. A spot color recipe is selected based upon an output of the function or a color profile based upon an output of the function is derived.

Experimental Performance Results

Figure 4:
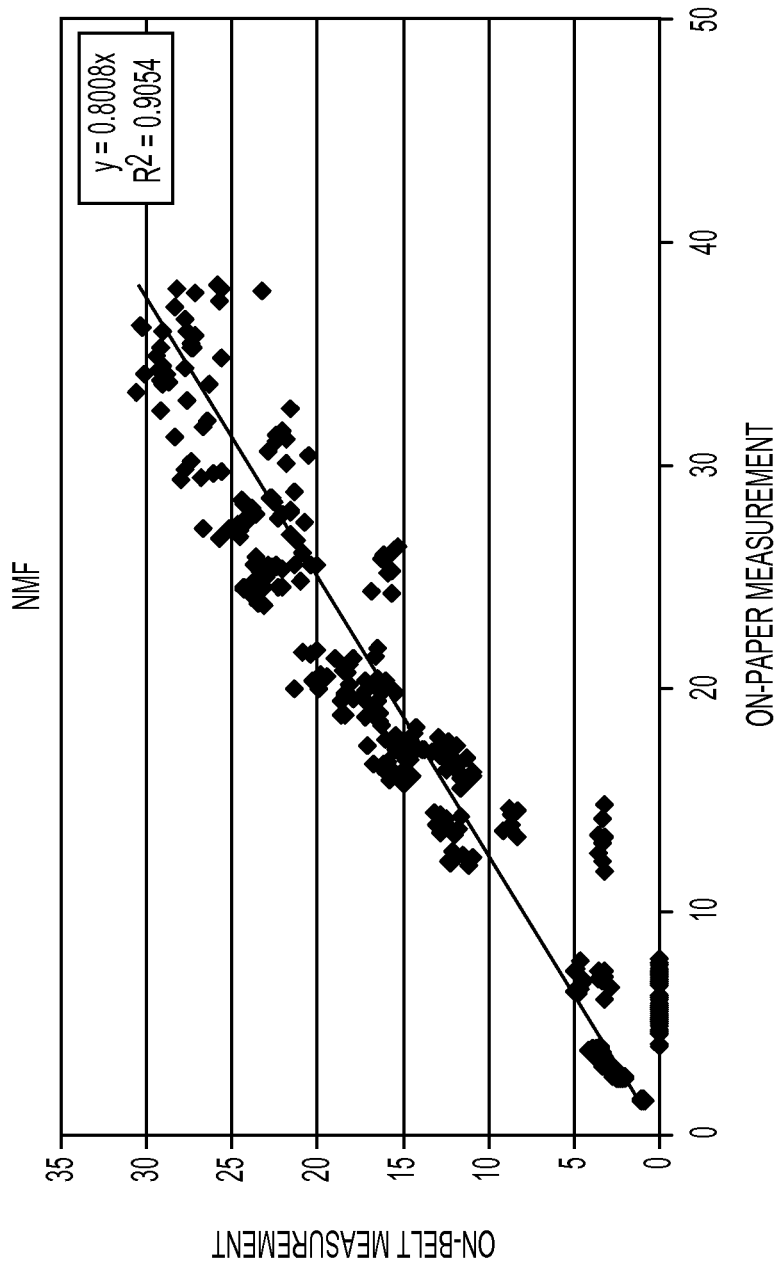
FIG. 4 is a plot of experimental performance results for the prediction model of FIG. 2 as further discussed with respect to the flow diagram of FIG. 3.

FIG. 4 is a plot of experimental performance results for testing the prediction of the corresponding on-paper measurement for a selected IQ metric of NMF (Noise Mottle Frequency) from an in-line calibrated sensor 230 on-belt. NMF is a Xerox-defined perceived-lightness measure of mottle and is one metric used to evaluate the uniformity of a halftone area and other areas. A lower NMF score infers a higher quality halftone uniformity. The X-axis is the on-paper NMF measurement data and the Y-axis the corresponding on-belt NMF measurement data for multiple copies of single separation patches (such as those shown in FIG. 1) for C, M, Y, K at 10%, 20%, . . . , 100% area coverage. Notice that the results show an acceptable result for prediction with the correlation $R^2$ of 0.91 even if a linear model is used. Prediction performance may be further improved with a higher-order polynomial model such as a quadratic model.

It is important to note that in one embodiment, single-separation colors are used but in another embodiment a subset of the multiple color separations may be used to predict the corresponding IQ metric measured on-paper for all the multiple color separations of interest.

Embodiment for 2-D IQ Metrics, e.g., Smoothness, Mottle, Graininess

Figure 5:
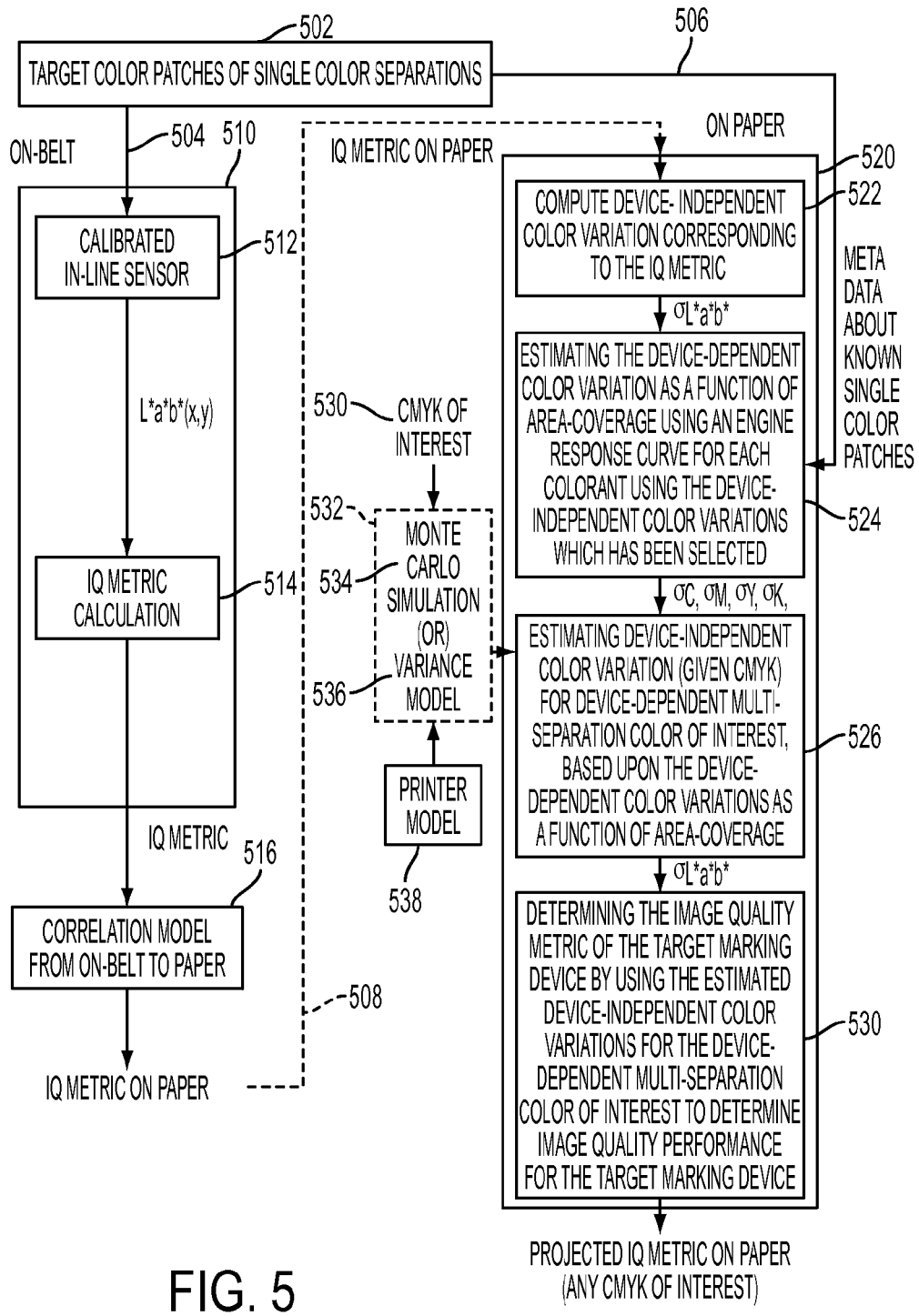
FIG. 5 is a block diagram illustrating one example embodiment for determining a 2-D image quality metric such as smoothness.

Reference is now being made to FIG. 5 which is a block diagram of an embodiment for determining 2-D IQ metrics such as smoothness. The block diagram is divided into two major sections. The first major section 510 illustrates the first system and method to predict the corresponding IQ metric on-paper for the selected IQ metric measured on-belt from an in-line sensor. This was described previously in the section above with reference to FIGS. 2-3. The second section 520 illustrates the second system and method to determine a CMYK of interest from a small sample of IQ measurements. Beginning in block 502, data for a target color patch or patches of single color separations are sent through the color marking system. An example of a color marking system in a printing network is further described in FIG. 14 incorporating a correlation model of FIGS. 2-3 and an IQ metric performance model of FIGS. 5-7. Prior to the fuser in marking system 510, a calibrated on-belt sensor 512 (as described in FIG. 2 as 220 and FIG. 14 as 1486) measures on-belt data. For this example the data is in spatial L*a*b*(x,y) which is fed to an IQ metric calculation 514. In this embodiment noise mottle frequency (NMF) is the metric selected but as described with reference to FIGS. 6 and 7 other IQ metrics are described as well. Depending on the print quality standard definition used for the IQ metric being measured in the patch, for example high spatial frequency noise, the sensitivity a* and b* may be less important. Specifically, for the IQ metric of mottle, the values of a*, b* are not needed in many industry definitions of NMF. However, this is not a limitation of this invention. The method is also well suited for the definition of color mottle or 2D color noises that take a* and b* into account.

In step 516 the IQ metric, in this example NMF, is correlated as described above with reference to FIGS. 2-3 to yield an on-paper IQ metric for NMF from the on-belt measurements for the IQ metric for NMF. In one embodiment, if all that is desired is to predict the corresponding IQ metric on-paper for the selected IQ metric measured on-belt from an in-line sensor, the process in the first major section 510 ends. In another embodiment, the process continues as shown by broken line 508 to the second major section 520 illustrates the second novel system and method to determine a CMYK of interest from a small sample of IQ measurements. Continuing with the second major section 520, an example for 2-D IQ metrics for determining non-structured noises/defects such as smoothness, mottle, graininess, etc. is shown. For structured (e.g. banding, moiré) and synchronized (e.g. streaks) defects, decomposition is not required as shown in the other IQ metrics described with reference to FIGS. 6-7 below.

The colors L* for mottle are obtained from the scanned test patches. These colors L* are averaged to produce the average L* value that is converted using the following equation for optical density (OD) to obtain the average optical density for the test patches. Device-independent color variations corresponding to the IQ metric are computed. The noise distributions in NMF spatial frequency range are measured. Given a two dimensional L* pixel map of the test patches, each pixel has a different L* value. Depending on the print quality standard definition being used for NMF the perceptual weights are not stripped out. In case of a NMF definition where the perceptual weights are important they are stripped or subtracted out in block 522 to be applied later in block 530. The NMF is the manipulated L* values of the scanned image. From the mottle frequency, a standard deviation can be calculated. That standard deviation, multiplied by 100, is corrected by the optical density (OD) as shown in EQ. 1 below. This gives us the mottle value for the test patches. The perceptual weighting is based upon a LUT of survey data which relates optical density to the Human Visual System (HVS).

In the definition of mottle that include perceptual weights, the L* values are converted to OD using the following relationship by EQ. 1:

$$Y = \begin{cases} \left(\frac{L^* + 16}{116}\right)^3 & L^* \geq 7.9996 \\ L^*/903.3 & \text{otherwise} \end{cases} \quad \text{EQ. 1}$$

$$OD = -\log_{10}(Y)$$

Again, for many standard definitions for mottle, only L* is mapped because *a and b* are not important in this definition.

Figure 8:
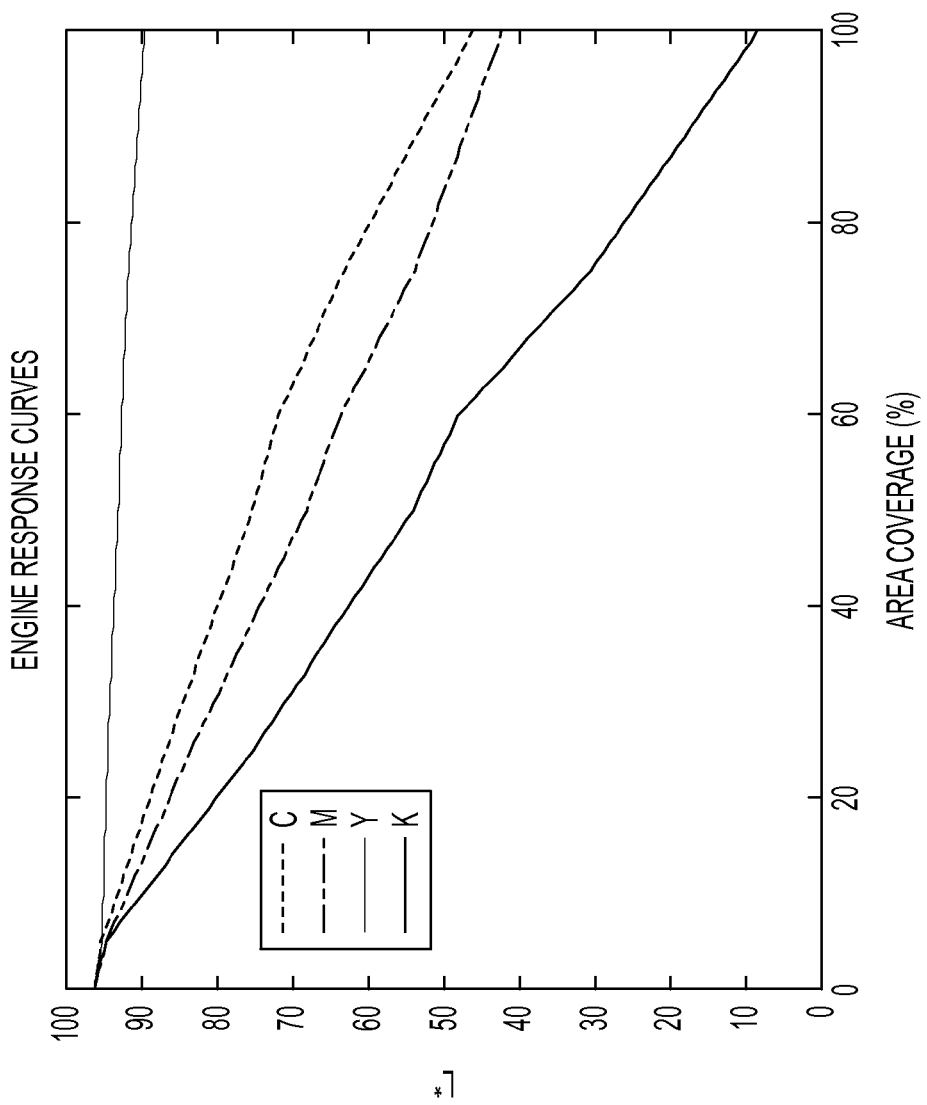
FIG. 8 is an example engine response curve used and discussed with respect to the example block diagrams of FIGS. 5-7.

Next the variance of the device-dependent color variations of color $\sigma_{L^*a^*b^*}$ is converted to a device-independent colorant variance value, such as $\sigma_{CMYK}$, using area-coverage of an engine response curve (ERC) 524, such as that shown in FIG. 8, for the known single color separation data for the target color patch of block 502.

Figure 9:
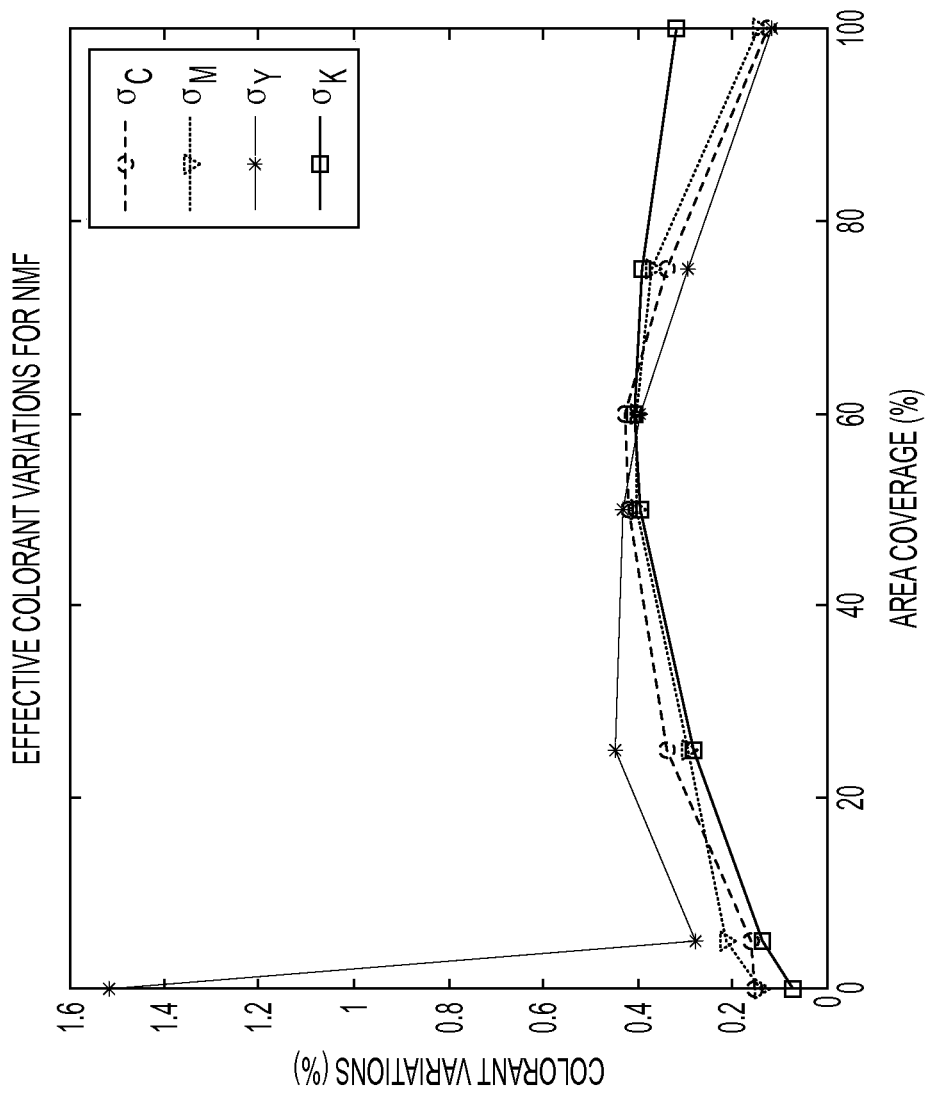
FIG. 9 is an example colorant variation curve for NMF used and discussed with respect to the example block diagrams of FIGS. 5-7.

The lightness variations are converted to colorant variations in functional block 524. These colorant variations are used to construct the NMF colorant variation curves. FIG. 9 shows an example of converted colorant variation curves for NMF, which is area-coverage dependent. To select the correct NMF colorant variation curves, the metadata 506 of the target color patches of single color separations is used. For IQ metrics where the contributions from a* and b* are important, two more sets of converted colorant variations for each IQ metric, i.e., one for a* and one for b*, are also constructed. These two additional converted colorant variations are in addition to the colorant variation curves shown in FIG. 9. Interpolation can be performed if necessary. As an example, let us assume that a test patch is measured at an area coverage of 50% black, and the NMF L* standard deviation (i.e. $\sigma_{L^*}$) is found to be around 5. The standard deviation 5 is the color variation at mottle frequency. The reason it is not zero is because the marking device or printer is not perfect. Stated differently, when the target color patches of single color separations are created by the marking device for 50% black, every pixel is not exactly at 50%. Some pixels are above 50% black while other pixels are below 50% black, and so on. Referring to the ERC in FIG. 8 it can be seen that L*=50±5 can be used to determine the corresponding area coverage for the range and thus determine the corresponding colorant variation for NMF at 50% black. Here are more details about this conversion. To convert color (say L*) variation to colorant variation (say black, K), one can use the ERC in FIG. 9. For example, for a given variation L*=50±5, where 5 is the standard deviation, the corresponding colorant variation in K can be estimated by $(K_1-K_2)/2$, where one passes L*=50−5 to the K-ERC to get $K_1$ and L*=50±5 to the K-ERC to get $K_2$. By repeating this process for different area-coverages of K, the colorant variation of K for NMF is determined as shown in FIG. 9. Similarly, by repeating the process for C, M, Y respectively, the colorant variations of C, M, Y for NMF are determined. The result from an experiment is shown in FIG. 9. This completes step 524; and the NMF colorant variation curves shown in FIG. 9 can be used in 526. As an example, consider a color with the following area coverages cyan=40%, magenta=40%, yellow=0%, and black=30%. Using the NMF colorant variation curves in FIG. 9 the value of $\sigma_c$ is determined at 40%. An examination of the cyan curve on the color variation plot for NMF in FIG. 9 shows that an area coverage of cyan at 40% yields (by interpolation) $\sigma_c \approx 0.4$. Similarly, for an area coverage of magenta at 40%, we determine that $\sigma_m \approx 0.4$. For an area coverage of yellow=0%, $\sigma_y \approx 1.5$. For an area coverage of black=30%, $\sigma_k \approx 0.4$.

At 526, the device-independent lightness variations are projected or estimated as device-independent color variations for any given multi-separation CMYK combinations of interest. This estimation of the device-independent color variation for a given CMYK is based upon the device-dependent color variations as a function of area-coverage. An overview of this novel projection technique is first described followed by a detailed mathematical example. The dashed box 532 in FIGS. 5, 6 and 7 denotes an optional embodiment. In one optional embodiment, a variance is imposed 532 using a Monte Carlo simulation 534 with NMF colorant variation curves and assume noise characteristics is normal distribution. In another optional embodiment, lightness variations for any given CMYK combination is projected via a variance model 536 with NMF colorant variation curves, the Jacobian of the nominal printer model 538. In this step, it is assumed that noises or variations in single-separations independently contribute to any CMYK combination while the colorant interaction captured in printer model 538 is only in the mean not in the variation. In another embodiment, the correlations using the variance model 536 approach by sparsely measuring additional test patches of multi-separation CMYK. However, this adds additional measurement cost and is not necessary for the IQ metric of mottle. One main difference between the two variance approaches in 532 is how the resulting variances are assessed. In one approach, the printer model 538 is used with Monte Carlo simulation 534 while alternatively the local Jacobian is used with the variance model 536. When the operational ranges are close to linear locally, both yield essentially the same result. The variance model 536 approach has lower computational costs. But when the operational ranges are highly non-linear for instance, the colorant variations are too large due to poor image marking device or printer performance or the CMYK color of interest 530 happens to have a very non-linear response in that portion of the printer model, a Monte Carlo simulation 534 will yield better results and may be preferred if the additional computational costs are acceptable.

At 530, the image quality metric (in this example NMF) of the target marking device is determined by using the estimated device-independent color variations for the device-dependent multi-separation color of interest to determine image quality performance for the target marking device. For this example, the mottle definition uses the perceptual weight, and these are applied to the projected variance of $\sigma_{L^*a^*b^*}$ from 526. The projected or estimated NMF for the CMYK of interest 530 is given by combining the calculated perceptual weights (function of L*, calculated from nominal printer model 538) and the projected $\sigma_{L^*a^*b^*}$. More specifically, a model is derived for relating independent colorant variations $\sigma_{CMYK}$ to lightness variations $\sigma_{L^*a^*b^*}$ via a Jacobian of the printer model 538 for the target marking device or printer.

Now a detailed mathematical description of the projection technique is described.

For L*, let f(•) be the functional form, which can be stored in a look up table (LUT) that describes the printer model for lightness, i.e. L*=f(C,M,Y,K). Assume that for a given color of interest ($C_0$, $M_0$, $Y_0$, $K_0$), the colorant variations due to printer noises has the standard deviations of ($\sigma_{C0}$, $\sigma_{M0}$, $\sigma_{Y0}$, $\sigma_{K0}$). Assuming further that these colorant variations are independently distributed, then the resulting lightness (L*) variation $\sigma_{L=L0}$, satisfies the following EQ. 2 (component of variances):

$$(\sigma_{L=L_0})^2 = \left(\frac{\partial f}{\partial c}\bigg|_{c=c_0}\right)^2 (\sigma_{c_0})^2 + \left(\frac{\partial f}{\partial m}\bigg|_{m=m_0}\right)^2 (\sigma_{m_0})^2 + \left(\frac{\partial f}{\partial y}\bigg|_{y=y_0}\right)^2 (\sigma_{y_0})^2 + \left(\frac{\partial f}{\partial k}\bigg|_{k=k_0}\right)^2 (\sigma_{k_0})^2 \qquad \text{EQ. 2}$$

That is, the color variance ($\sigma^2$) of the printer model output L is a linear combination of the individual variances with the square of the local Jacobian slopes.

Likewise in those image quality metrics where a* and b* contributions are desired, for a* let g(•) be the functional form, which can be stored in a look up table (LUT) that describes the printer model for a*, i.e. a*=g(C,M,Y,K). Assume that for a given color of interest ($C_0$, $M_0$, $Y_0$, $K_0$), the colorant variations due to printer noises have the standard deviations of ($\sigma_{C0}$, $\sigma_{M0}$, $\sigma_{Y0}$, $\sigma_{K0}$). Assuming further that these colorant variations are independently distributed, then the resulting a* variation $\sigma_{a=a0}$, satisfies the following EQ. 3 (component of variances):

$$(\sigma_{a=a_0})^2 = \left(\frac{\partial g}{\partial c}\bigg|_{c=c_0}\right)^2 (\sigma_{c_0})^2 + \left(\frac{\partial g}{\partial m}\bigg|_{m=m_0}\right)^2 (\sigma_{m_0})^2 + \left(\frac{\partial g}{\partial y}\bigg|_{y=y_0}\right)^2 (\sigma_{y_0})^2 + \left(\frac{\partial g}{\partial k}\bigg|_{k=k_0}\right)^2 (\sigma_{k_0})^2 \qquad \text{EQ. 3}$$

For b*, let h(•) be the functional form, which can be stored in a look up table (LUT) that describes the printer model for b*, i.e. b*=h(C,M,Y,K). Assume that for a given color of interest ($C_0$, $M_0$, $Y_0$, $K_0$), the colorant variations due to printer noises have the standard deviations of ($\sigma_{C0}$, $\sigma_{M0}$, $\sigma_{Y0}$, $\sigma_{K0}$). Assuming further that these colorant variations are independently distributed, then the resulting b* variation $\sigma_{b=b0}$, satisfies the following EQ. 4 (component of variances):

$$(\sigma_{b=b_0})^2 = \left(\frac{\partial h}{\partial c}\bigg|_{c=c_0}\right)^2 (\sigma_{c_0})^2 + \left(\frac{\partial h}{\partial m}\bigg|_{m=m_0}\right)^2 (\sigma_{m_0})^2 + \left(\frac{\partial h}{\partial y}\bigg|_{y=y_0}\right)^2 (\sigma_{y_0})^2 + \left(\frac{\partial h}{\partial k}\bigg|_{k=k_0}\right)^2 (\sigma_{k_0})^2 \qquad \text{EQ. 4}$$

In the case of the variance model 536, this is extended to project or estimate variance model to include correlation i.e. remove the above-described restriction that the colorant variations are independently distributed.

Similar to EQ. 2, one can relieve the independence constraint by adding correlation terms. That is, $$\sigma_L^2 = \qquad \text{EQ. 5}$$

$$\begin{bmatrix} \left(\frac{\partial f}{\partial c}\right)^2 & \rho_{cm}\frac{\partial f}{\partial c}\frac{\partial f}{\partial m} & \rho_{cy}\frac{\partial f}{\partial c}\frac{\partial f}{\partial y} & \rho_{ck}\frac{\partial f}{\partial c}\frac{\partial f}{\partial k} \\ \rho_{cm}\frac{\partial f}{\partial c}\frac{\partial f}{\partial m} & \left(\frac{\partial f}{\partial m}\right)^2 & \rho_{my}\frac{\partial f}{\partial m}\frac{\partial f}{\partial y} & \rho_{mk}\frac{\partial f}{\partial m}\frac{\partial f}{\partial k} \\ \rho_{cy}\frac{\partial f}{\partial c}\frac{\partial f}{\partial y} & \rho_{my}\frac{\partial f}{\partial m}\frac{\partial f}{\partial y} & \left(\frac{\partial f}{\partial y}\right)^2 & \rho_{yk}\frac{\partial f}{\partial y}\frac{\partial f}{\partial k} \\ \rho_{ck}\frac{\partial f}{\partial c}\frac{\partial f}{\partial k} & \rho_{mk}\frac{\partial f}{\partial m}\frac{\partial f}{\partial k} & \rho_{yk}\frac{\partial f}{\partial y}\frac{\partial f}{\partial k} & \left(\frac{\partial f}{\partial k}\right)^2 \end{bmatrix} \begin{bmatrix} \sigma_c^2 \\ \sigma_m^2 \\ \sigma_y^2 \\ \sigma_k^2 \end{bmatrix}$$

for $c = c_0$, $m = m_0$, $y = y_0$, $k = k_0$.

Figure 12:
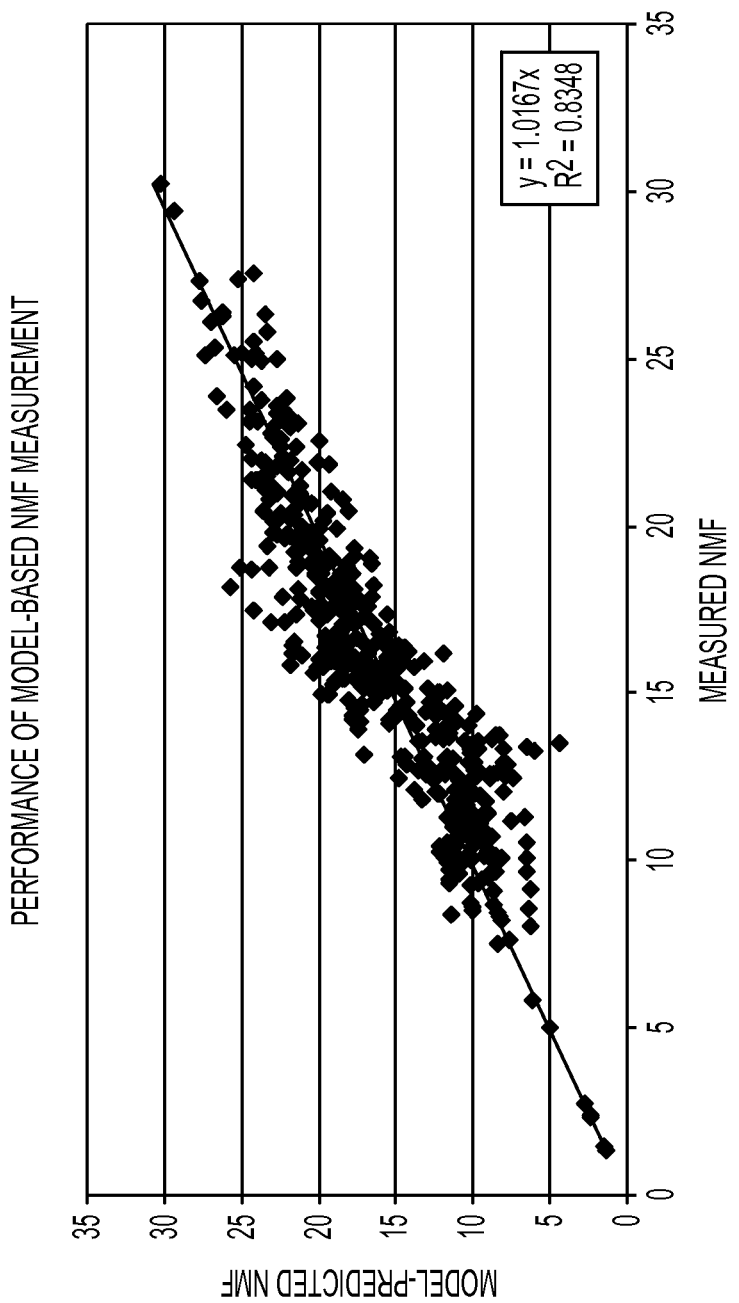
FIGS. 12 and 13 are plots of the performance model discussed with respect to the embodiments of FIGS. 10-11, using each of a Monte Carlo and a Variance Model approach.
Figure 13:
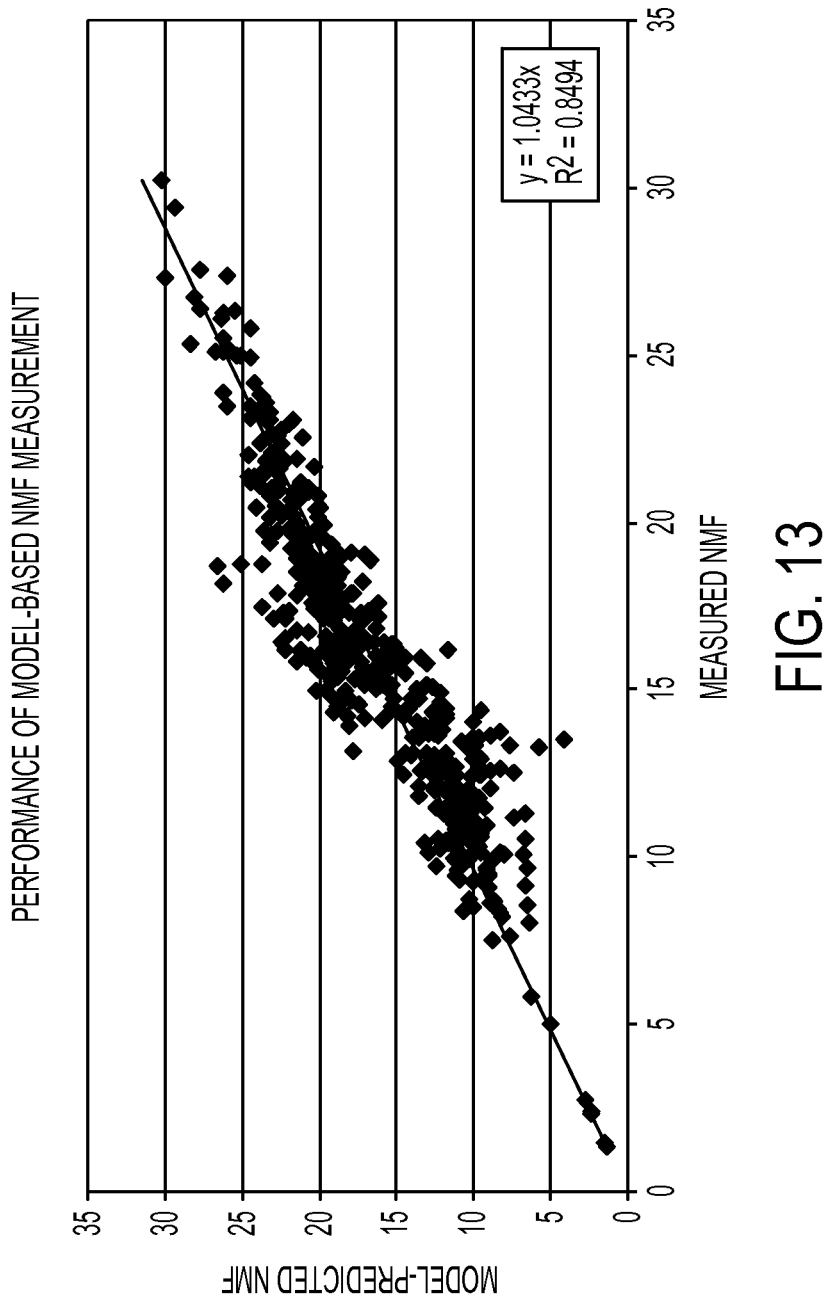

Note that $\rho_{CM}$ is the correlation coefficient (from −1 to 1) between C&M. It is zero when the colorants are independent (thus EQ. 2 reduces to EQ. 5).

correlates well with actual NMF measurement as shown in Table 1 and illustrated in FIG. 12 (using Monte Carlo method) and FIG. 13 (using Variance model method, i.e., EQ. 2).

TABLE 1

|  |  | PrinterA | PrinterB#1 | PrinterB#2 | PrinterB#3 | PrinterB#4 | PrinterB#5 | PrinterB#6 |
|---|---|---|---|---|---|---|---|---|
| With Mante Carlo | Slope | 0.9909 | 1.0368 | 1.0183 | 1.0276 | 1.0167 | 1.0168 | 1.0494 |
|  | $R^2$ | 72.99% | 76.91% | 78.35% | 80.91% | 83.48% | 79.55% | 80.84% |
| With Variance Model | Slope | 1.0197 | 1.033 | 1.0156 | 1.0304 | 1.0433 | 1.0057 | 1.0667 |
|  | $R^2$ | 74.67% | 77.13% | 77.34% | 81.33% | 84.94% | 79.51% | 81.63% |

Likewise for a*, $$\sigma_a^2 = \begin{bmatrix} \left(\frac{\partial g}{\partial c}\right)^2 & \rho_{cm}\frac{\partial g}{\partial c}\frac{\partial g}{\partial m} & \rho_{cy}\frac{\partial g}{\partial c}\frac{\partial g}{\partial y} & \rho_{ck}\frac{\partial g}{\partial c}\frac{\partial g}{\partial k} \\ \rho_{cm}\frac{\partial g}{\partial c}\frac{\partial g}{\partial m} & \left(\frac{\partial g}{\partial m}\right)^2 & \rho_{my}\frac{\partial g}{\partial m}\frac{\partial g}{\partial y} & \rho_{mk}\frac{\partial g}{\partial m}\frac{\partial g}{\partial k} \\ \rho_{cy}\frac{\partial g}{\partial c}\frac{\partial g}{\partial y} & \rho_{my}\frac{\partial g}{\partial m}\frac{\partial g}{\partial y} & \left(\frac{\partial g}{\partial y}\right)^2 & \rho_{yk}\frac{\partial g}{\partial y}\frac{\partial g}{\partial k} \\ \rho_{ck}\frac{\partial g}{\partial c}\frac{\partial g}{\partial k} & \rho_{mk}\frac{\partial g}{\partial m}\frac{\partial g}{\partial k} & \rho_{yk}\frac{\partial g}{\partial y}\frac{\partial g}{\partial k} & \left(\frac{\partial g}{\partial k}\right)^2 \end{bmatrix}\begin{bmatrix}\sigma_c^2\\\sigma_m^2\\\sigma_y^2\\\sigma_k^2\end{bmatrix} \quad \text{EQ. 6}$$

for $c = c_0, m = m_0, y = y_0, k = k_0$.

Likewise for b*, $$\sigma_b^2 = \begin{bmatrix} \left(\frac{\partial h}{\partial c}\right)^2 & \rho_{cm}\frac{\partial h}{\partial c}\frac{\partial h}{\partial m} & \rho_{cy}\frac{\partial h}{\partial c}\frac{\partial h}{\partial y} & \rho_{ck}\frac{\partial h}{\partial c}\frac{\partial h}{\partial k} \\ \rho_{cm}\frac{\partial h}{\partial c}\frac{\partial h}{\partial m} & \left(\frac{\partial h}{\partial m}\right)^2 & \rho_{my}\frac{\partial h}{\partial m}\frac{\partial h}{\partial y} & \rho_{mk}\frac{\partial h}{\partial m}\frac{\partial h}{\partial k} \\ \rho_{cy}\frac{\partial h}{\partial c}\frac{\partial h}{\partial y} & \rho_{my}\frac{\partial h}{\partial m}\frac{\partial h}{\partial y} & \left(\frac{\partial h}{\partial y}\right)^2 & \rho_{yk}\frac{\partial h}{\partial y}\frac{\partial h}{\partial k} \\ \rho_{ck}\frac{\partial h}{\partial c}\frac{\partial h}{\partial k} & \rho_{mk}\frac{\partial h}{\partial m}\frac{\partial h}{\partial k} & \rho_{yk}\frac{\partial h}{\partial y}\frac{\partial h}{\partial k} & \left(\frac{\partial h}{\partial k}\right)^2 \end{bmatrix}\begin{bmatrix}\sigma_c^2\\\sigma_m^2\\\sigma_y^2\\\sigma_k^2\end{bmatrix} \quad \text{EQ. 7}$$

for $c = c_0, m = m_0, y = y_0, k = k_0$.

This model is more accurate and general but requires more effort since it requires that we characterize the correlation coefficients locally for all colors of interest and assume that the identified correlation coefficients hold for a reasonable amount of time (so that constant updates are not required). It is important to note that in this second major section 520 for the 2-dimensional IQ defects such as NMF, for any given CMYK of interest 530 the corresponding NMF can be estimated over a large complex set of conditions based upon measurements taken over a small simple set of conditions for target color patches 502.

Figure 10:
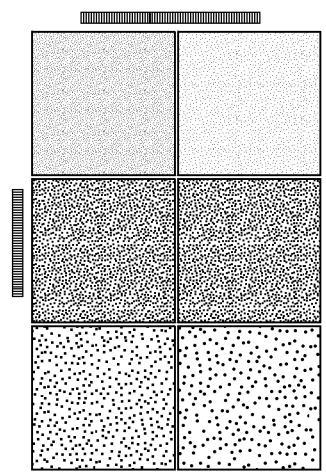
FIG. 10 shows an example single-separation test-page (at 5%, 25%, 50%, 60%, 75%, 100%) for Noise Mottle Frequency (NMF) from a training set that includes only single-separation colors.
Figure 11:
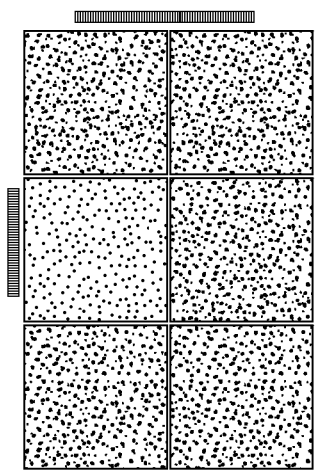
FIG. 11 shows an example testing page that includes multi-separation colors.

To demonstrate the feasibility hereof, experiments were done using PrinterA and PrinterB. First, 4 single-separation test-pages (at 5%, 25%, 50%, 60%, 75%, 100%) were printed (an example is shown in FIG. 10) for training the model, and ~100 multi-separation test-pages (at 0%, 25%, 50%, 75%, 100% nodes of CMYK, i.e. a total of $5^4$=625 patches) were printed for testing the model. An example is shown in FIG. 10. These patches were then scanned and NMF measured.

The estimation model of FIG. 5 is applied using the measurement data and scans of the 4 single-separation test pages (training set) of FIG. 10. A corresponding PrinterA or PrinterB printer model was used to predict the NMF. The result Some of the residual errors can be accounted for by the intrinsic page to page variations and the assumption that mottle noises are contributed independently from each separation. Note that the good correlation indicates that the independence assumption is quite reasonable. The performance of the Monte Carlo approach and the variance model are similar. Thus, using the variance model may be preferred for many devices.

An advantage of this method over existing methods, such as brute-force on-paper method, is the use of in-line on-belt sensing. This enables the possibility of constant updating of image quality databases with all the benefits of on-belt sensing from in-line sensors. Example benefits include paper-less sensing, high update rates without loss of productivity, and reuse of existing in-line sensors in certain marking devices. This novel invention provides a cost-effective and feasible solution that is necessary for enabling various technologies.

Embodiment for Color Stability and Color Uniformity IQ Metrics

Figure 6:
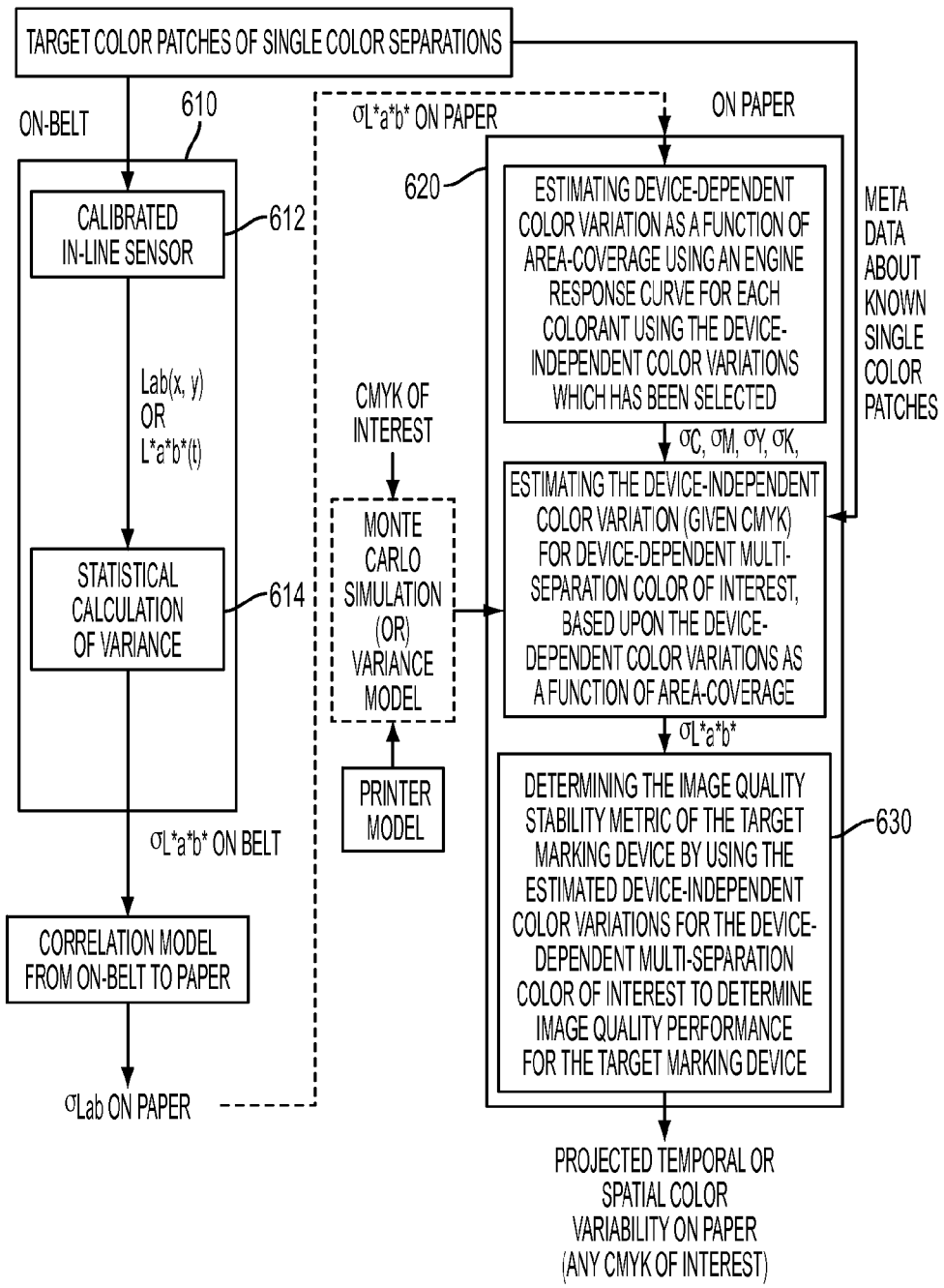
FIG. 6 is a block diagram of one example embodiment for determining an image quality metric such as color stability and/or color uniformity.

Reference is now being made to FIG. 6, which is a block diagram of an embodiment for determining IQ metrics such as color stability and/or color uniformity. To avoid duplication and for sake of brevity, only those portions of FIG. 6 which differ from block diagram FIG. 5 are described. To begin in this embodiment notice the calibrated on-belt sensor 612 (as described in FIG. 2 at 220 and FIG. 14 at 1486) measures on-belt data. For this example the data is in spatial L*a*b*(x,y) or temporal L*a*b*(t) form, which is fed to an IQ metric calculation 614. This is important especially in applications where gradual color variations across the page are important. One example is a "multi-up" print job where multiple identical images are formed on a single sheet, such as, a sheet of business card graphics, or identical photographs. The stripping and applying of perceptual weights in 522 and 530 are not shown in section 620 because the standard definition of the IQ metric of color stability and color variations do not need these steps. A calculation in 630 is made for the color difference formula $\Delta E$. This is a measurement of the magnitude of difference between two colors. One example of a difference formula is defined by CIE Publication 142-2001, the teachings of which are hereby incorporated by reference hereinto in their entirety.

Likewise for FIG. 6, it is important to note that in this second major section 620 for the color stability or color variation IQ metric, or device-independent color variation can be estimated over a large complex set of conditions based upon device-dependent color measurements taken over a small simple set of conditions for target color patches 502.

Embodiment for Banding IQ Metrics

Figure 7:
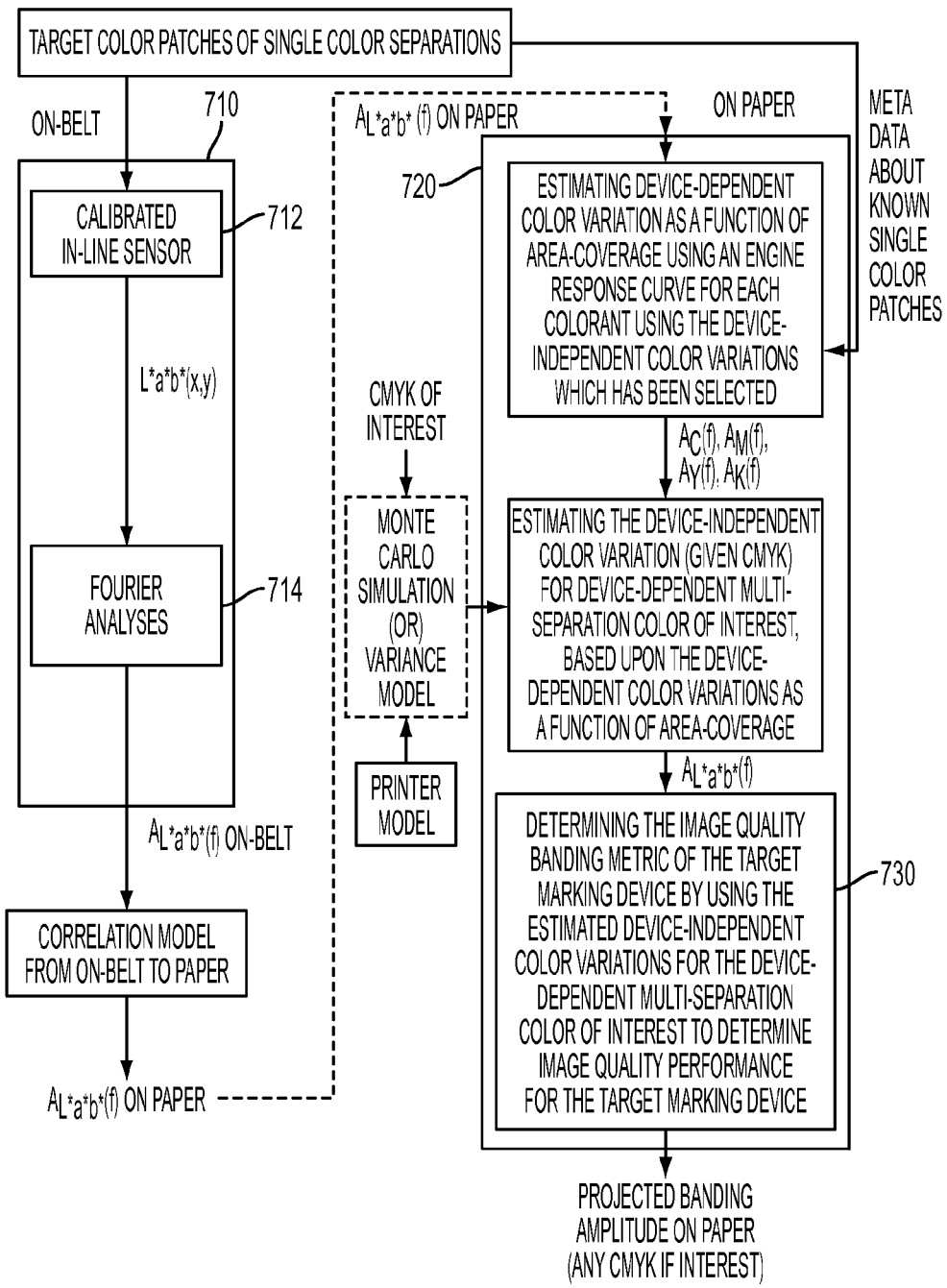
FIG. 7 is a block diagram of one example embodiment for determining an image quality metric such as banding.

Reference is now being made to FIG. 7, which is a block diagram of an embodiment for determining IQ metrics such as banding. Again, to avoid duplication and for sake of brevity, only those portions of FIG. 7 which differ from the block diagram of FIG. 5 are described.

To begin, calibrated on-belt sensor 612 (as described in FIG. 2 at 220 and FIG. 14 at 1486) measures on-belt data. For this example the data is in spatial L*a*b*(x,y) which is subjected to a Fourier Analysis 714 to find the spatial frequencies to produce $A_{L^*a^*b^*}(\overline{\omega})$, where $A_{L^*a^*b^*}(\overline{\omega})$ represents amplitude as a function of frequency. Banding is typically periodic, caused by, for example, an out-of-round drum or roller. The $A_{L^*a^*b^*}(\overline{\omega})$ provides the spectrum of the several different frequencies of interest. Again, the stripping and applying of perceptual weights in 522 and 528 are not shown in section 720 because the definition of color stability and color variations do not need these steps. For this example, in step 730 the image quality banding metric of the target marking device is determined by using the estimated device-independent color variations for the device-dependent multi-separation color of interest. The image quality banding metric is used to determine image quality performance for the target marking device. The equations for banding will next be described.

Let f(•) be the functional form, which can be stored in a look up table (LUT) that describes the printer model for lightness, i.e., $L^*=f(C,M,Y,K)$. Assume that for a given color of interest ($C_0$, $M_0$, $Y_0$, $K_0$), the colorant variations due to printer noises has the standard deviations of ($A_{C0}$, $A_{M0}$, $A_{Y0}$, $A_{K0}$). Assuming further that these colorant variations are independently distributed, then the resulting lightness (L*) variation $\sigma_{L=L0}$, satisfies the following EQ. 8 (component of variances):

$$(A_{L=L_0})^2 = \left(\frac{\partial f}{\partial c}\bigg|_{c=c_0}\right)^2 (A_{c_0})^2 + \left(\frac{\partial f}{\partial m}\bigg|_{m=m_0}\right)^2 (A_{m_0})^2 + \left(\frac{\partial f}{\partial y}\bigg|_{y=y_0}\right)^2 (A_{y_0})^2 + \left(\frac{\partial f}{\partial k}\bigg|_{k=k_0}\right)^2 (A_{k_0})^2 \quad \text{EQ. 8}$$

That is, the amplitude as a function of frequency $\overline{\omega}$ ($A(\overline{\omega})$) of the printer model output L is the linear combination of the individual variances with the square of the local Jacobian slopes. EQ. 8 predicts the worst case scenario since the phase interactions among C/M/Y/K are ignored and all positive terms in the right hand side of the equation are used. This can be improved by adding phase dependency to EQ. 8. Alternatively, phases can be incorporated in the Monte Carlo simulation with various cmyk phase combinations to assess the potential range of banding amplitudes for the given color of interest ($C_0$, $M_0$, $Y_0$, $K_0$).

Likewise in those IQ metrics where a* and b* contributions are desired, for a* let g(•) be the functional form, which can be stored in a look up table (LUT) that describes the printer model for a*, i.e. $a^*=g(C,M,Y,K)$. Assume that for a given color of interest ($C_0$, $M_0$, $Y_0$, $K_0$), the colorant variations due to printer noises has the standard deviations of ($\sigma_{C0}$, $\sigma_{M0}$, $\sigma_{Y0}$, $\sigma_{K0}$). Assuming further that these colorant variations are independently distributed, then the resulting a* variation $\sigma_{a=a0}$, satisfies the following EQ. 9 (component of variances):

$$(A_{a=a_0})^2 = \left(\frac{\partial g}{\partial c}\bigg|_{c=c_0}\right)^2 (A_{c_0})^2 + \left(\frac{\partial g}{\partial m}\bigg|_{m=m_0}\right)^2 (A_{m_0})^2 + \left(\frac{\partial g}{\partial y}\bigg|_{y=y_0}\right)^2 (A_{y_0})^2 + \left(\frac{\partial g}{\partial k}\bigg|_{k=k_0}\right)^2 (A_{k_0})^2 \quad \text{EQ. 9}$$

For b* let h(•) be the functional form, which can be stored in a look up table (LUT) that describes the printer model for b*, i.e., $b^*=h(C,M,Y,K)$. Assume that for a given color of interest ($C_0$, $M_0$, $Y_0$, $K_0$), the colorant variations due to printer noises has the standard deviations of ($\sigma_{C0}$, $\sigma_{M0}$, $\sigma_{Y0}$, $\sigma_{K0}$). Assuming further that these colorant variations are independently distributed, then the resulting b* variation $\sigma_{b=b0}$, satisfies the following EQ. 10 (component of variances):

$$(A_{b=b_0})^2 = \left(\frac{\partial h}{\partial c}\bigg|_{c=c_0}\right)^2 (A_{c_0})^2 + \left(\frac{\partial h}{\partial m}\bigg|_{m=m_0}\right)^2 (A_{m_0})^2 + \left(\frac{\partial h}{\partial y}\bigg|_{y=y_0}\right)^2 (A_{y_0})^2 + \left(\frac{\partial h}{\partial k}\bigg|_{k=k_0}\right)^2 (\sigma_{k_0})^2 \quad \text{EQ. 10}$$

In the case of the variance model 536, this is extended to project or estimate variance model to include correlation i.e. remove the above-described restriction of that the colorant variations are independently distributed.

A model can be formulated that is identical to Equations 5-7 above, by substituting the term σ with $A(\overline{\omega})$.

Likewise for FIG. 7, it is important to note that in this second major section 720 for banding of a given frequency, at any given CMYK of interest 530 the corresponding banding can be estimated over a large complex set of conditions based upon measurements taken over a small simple set of conditions for target color patches 502. In one embodiment, the output 530, 630 and 730 of FIGS. 5-7 are used to predict image quality performance of the target marking device. In various embodiments, the estimated device-independent color variations can be used to predict image quality performance of the target marking device. The image quality performance can be used for performing diagnostic, tracking, performing maintenance, performing a color management parameter adjustment, device assessment, soft-proofing, workflow analysis, and notifying an operator. Other uses are intended to fall within the scope of the appended claims.

In another embodiment, nonlinearities of the image quality metric are estimated and removed from the measured image quality metrics prior to converting each of the image quality metrics to a corresponding measure of device-independent color variation; and re-inserting the estimated nonlinearities into the measured image quality metrics prior to estimating the corresponding area-coverage dependent noise distribution. Such uses to determine image quality performance include defining an application dependent function having user-selected image noise attributes as inputs and providing those attributes and the estimated image noise performance values to the function. A spot color recipe can be selected based upon the output of the function. A color profile can be derived from an output of the function.

Image noise performance values can be compared against a manufacturer's specification or a user-defined specification, and based upon the comparison, the image noise level of the target marking device can be determined relative to a defined noise tolerance level. The image noise levels of the target marking device can be used for performing a diagnostic and/or performing a maintenance on the target marking device, or for notifying an operator of the target marking device that the noise levels have exceeded (or are anticipated to exceed) desired levels.

A current state of the target marking device can be determined based upon the estimated image noise performance values and used as a basis for performing a color management parameter adjustment, a device assessment, soft-proofing, and workflow analysis. Image noise performance values can be collected over time and stored in a historical database. Such values can be used to project when the target marking device will reach a defined noise tolerance threshold. These projections can be based upon any of: a time, a date, a count of a number of pages printed by the target marking device, and a number of hours of operation of the target marking device.

Schematic of Example Special Purpose Computer

Figure 14:
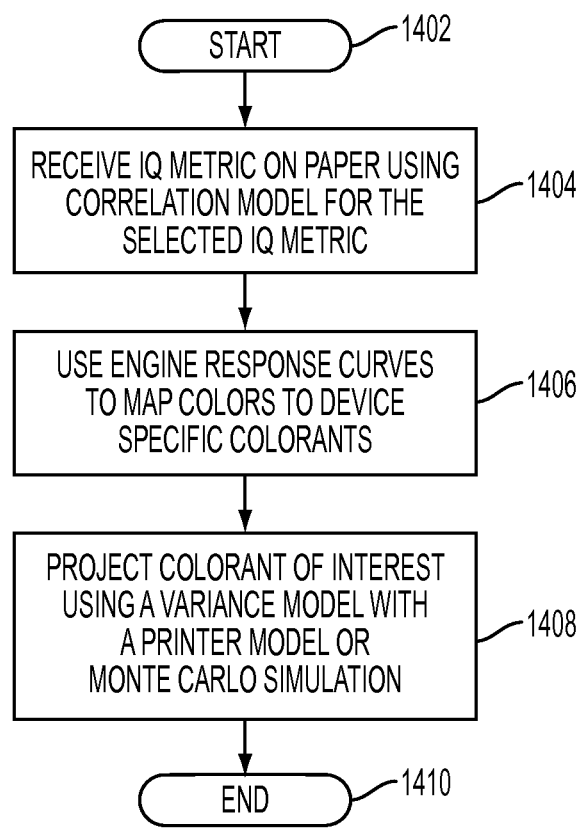
FIG. 14 is an example functional block diagram of a color marking device in a networked printing environment incorporating various features and embodiments of the predictive correlation model of FIGS. 2-3 and the performance models of FIGS. 5-7.
Figure 15:
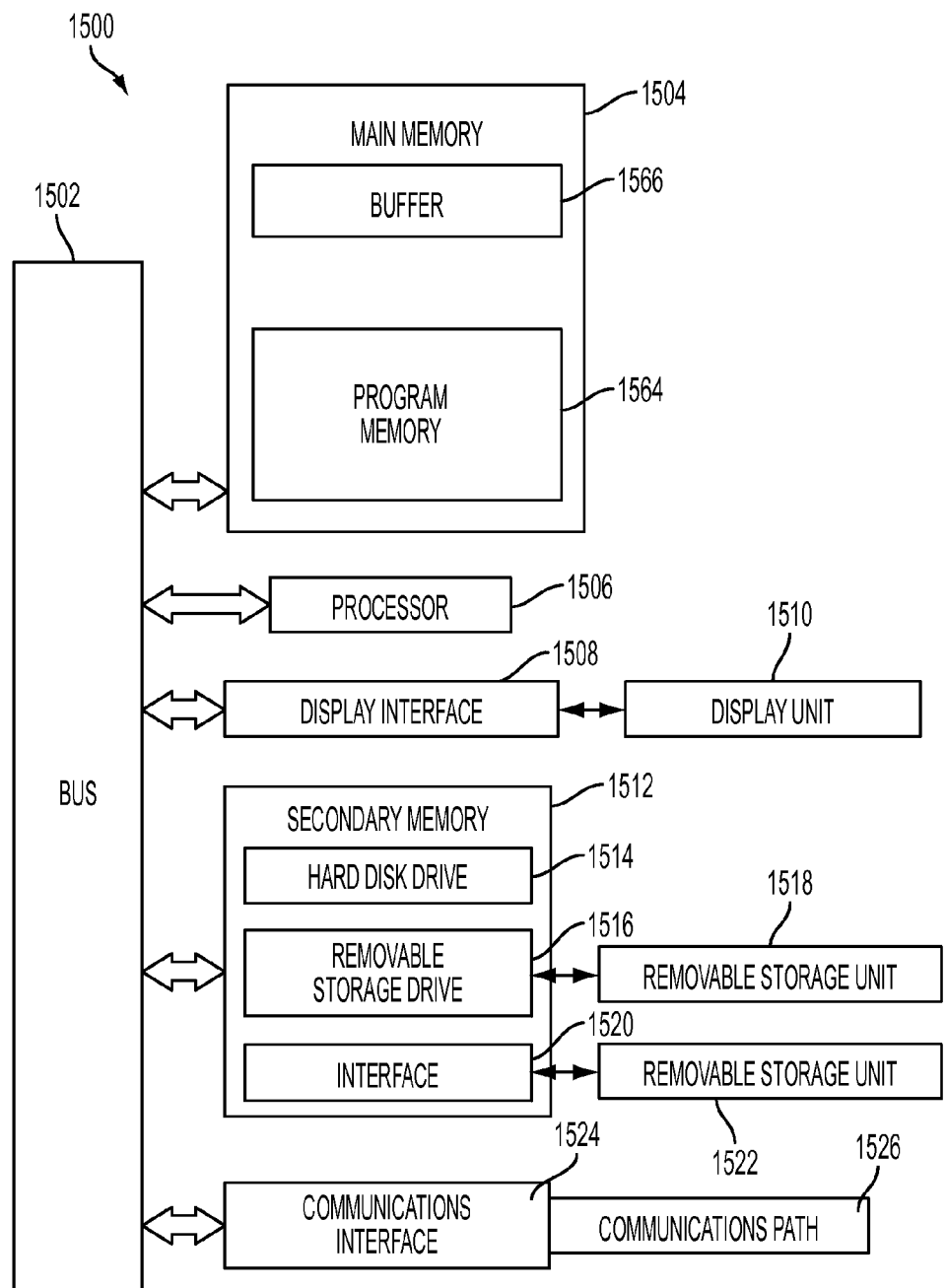
FIG. 15 illustrates a block diagram of one example embodiment of a special purpose computer useful for implementing one or more aspects of the present method, as shown and discussed with respect to the above-described illustrations.

Referring to FIG. 14, shown is a functional block diagram of one example special purpose computer useful for implementing one or more aspects of the present invention including the correlation model of FIG. 2 and IQ metric performance models of FIGS. 5-7. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network.

The special purpose computer of FIG. 14 could be implemented as a separate computer system, an electronic circuit, or an ASIC, for example. The nature of the implementation will depend on the processing environment wherein the present method finds its intended uses.

Special purpose computer system 1400 includes processor 1406 for executing machine executable program instructions for carrying out all or some of the present method. The processor is in communication with bus 1402. The system includes main memory 1404 for storing machine readable instructions. Main memory may comprise random access memory (RAM) to support reprogramming and flexible data storage. Buffer 1466 stores data addressable by the processor. Program memory 1464 stores machine readable instructions for performing the present method. A display interface 1408 forwards data from bus 1402 to display 1410. Secondary memory 1412 includes a hard disk 1414 and storage device 1416 capable of reading/writing to removable storage unit 1418, such as a floppy disk, magnetic tape, optical disk, etc. Secondary memory 1412 may further include other mechanisms for allowing programs and/or machine executable instructions to be loaded onto the processor. Such mechanisms may include, for example, a storage unit 1422 adapted to exchange data through interface 1420 which enables the transfer of software and data. The system includes a communications interface 1424 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 1426 which carries such signals and may be implemented using wire, cable, fiber optic, phone line, cellular link, RF, memory, or other means known in the arts.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein.

It should be understood that one or more aspects of the present method are intended to be incorporated in an article of manufacture, including one or more computer program products. The article of manufacture may be included on a storage device readable by a machine architecture, xerographic system, color management or other image processing system, any of which capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and function and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A computer-implemented method for determining at least one image quality metric of a color marking device, the method comprising:

receiving at least one device-independent color variation corresponding to at least one image quality metric for device-dependent single-separation colors of a target marking device;

estimating a device-dependent color variation as a function of area-coverage for each colorant using said device-independent color variation;

estimating at least one device-independent color variation for at least one device-dependent multi-separation color of interest, based upon said device-dependent color variation as a function of area-coverage; and determining said image quality metric of said target marking device by using said estimated device-independent color variation for said at least one device-dependent multi-separation color of interest.

2. The method of claim 1, wherein said image quality metric is at least one of graininess, mottle, banding, temporal color variation, and streaking.

3. The method of claim 1, wherein at least one device-independent color variation corresponding to at least one image quality metric comprises measuring said device-independent color variations from at least one color test target printed with device-dependent single-separation colors using a target marking device.

4. The method of claim 1, wherein at least one device-independent color variation corresponding to at least one image quality metric includes computing said device-independent color variation from a value of said image quality metric.

5. The method of claim 1, wherein estimating a device-independent color variation for at least one device-dependent multi-separation color of interest comprises using a Monte Carlo simulation with at least one of:
- a printer model of a target marking device, and said estimated device-dependent color variation as a function of area-coverage corresponding to each colorant; and
- a cross-colorant correlation model.

6. The method of claim 1, wherein estimating a device-independent color variation for at least one device-dependent multi-separation color of interest comprises using a variance model with at least one of:
- said estimated device-dependent color variation as a function of area-coverage corresponding to each colorant, and a Jacobian matrix of a printer model of a target marking device; and
- a cross-colorant correlation model.

7. The method of claim 1, wherein using said estimated device-independent color variation further comprises at least one of: performing a diagnostic, tracking, performing a maintenance, performing a color management parameter adjustment, device assessment, soft-proofing, workflow analysis, and notifying an operator.

8. The method of claim 3, wherein said at least one color test target includes device-dependent multi-separation colors in addition to said device-dependent single-separation colors.

9. A system for determining at least one image quality metric of a color marking device, said system comprising:
- a memory;
- a storage medium for storing data; and
- a processor in communication with said storage medium and said memory, said processor executing machine readable instructions for performing the method of:
  - receiving at least one device-independent color variation corresponding to at least one image quality variation for device-dependent single-separation colors of a target marking device;
  - estimating a device-dependent color variation as a function of area-coverage for each colorant using said device-independent color variation;
  - estimating at least one device-independent color variation for at least one device-dependent multi-separation color of interest, based upon said device-dependent color variation as a function of area-coverage; and
  - determining said image quality variation of said target marking device by using said estimated device-independent color variation for said at least one device-dependent multi-separation color of interest.

10. The system of claim 9, wherein said image quality metric is at least one of graininess, mottle, banding, temporal color variation, and streaking.

11. The system of claim 9, wherein at least one device-independent color variation corresponding to at least one image quality metric comprises measuring said device-independent color variations from at least one color test target printed with device-dependent single-separation colors using a target marking device.

12. The system of claim 9, wherein at least one device-independent color variation corresponding to at least one image quality variation includes computing said device-independent color variation from a value of said image quality variation.

13. The system of claim 9, wherein estimating a device-independent color variation for at least one device-dependent multi-separation color of interest comprises using a Monte Carlo simulation with at least one of:
- a printer model of a target marking device, and said estimated device-dependent color variation as a function of area-coverage corresponding to each colorant; and
- a cross-colorant correlation model.

14. The system of claim 9, wherein estimating a device-independent color variation for at least one device-dependent multi-separation color of interest comprises using a variance model with at least one of:
- said estimated device-dependent color variation as a function of area-coverage corresponding to each colorant, and a Jacobian matrix of a printer model of a target marking device; and
- a cross-colorant correlation model.

15. The system of claim 9, wherein using said estimated device-independent color variation further comprises at least one of: performing a diagnostic, tracking, performing a maintenance, performing a color management parameter adjustment, device assessment, soft-proofing, workflow analysis, and notifying an operator.

16. The system of claim 11, wherein said at least one color test target includes device-dependent multi-separation colors in addition to said device-dependent single-separation colors.

17. A computer-implemented method for determining at least one image quality metric of a color marking device, the method comprising:
- reading at least one single color test target printed with device-dependent single-separation colors using a target marking device;
- measuring from the single-separation color test patch at least one device-independent color variation corresponding to at least one image quality variation for device-dependent single-separation colors of the target marking device, wherein the image quality metric is at least one of graininess, mottle, banding, temporal color variation, and streaking;
- estimating a device-dependent color variation as a function of area-coverage for each colorant using said device-independent color variation;
- estimating at least one device-independent color variation for at least one device-dependent multi-separation color of interest, based upon said device-dependent color variation as a function of area-coverage;
- determining said image quality metric of said target marking device by using said estimated device-independent color variation for said at least one device-dependent multi-separation color of interest; and
- computing said device-independent color variation from a value of said image quality metric.

* * * * *